(12) United States Patent
Aoki

(10) Patent No.: US 8,488,096 B2
(45) Date of Patent: Jul. 16, 2013

(54) LIQUID CRYSTAL DISPLAY DEVICE WITH HEATER

(75) Inventor: Naoyuki Aoki, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/422,655

(22) Filed: Mar. 16, 2012

(65) Prior Publication Data

US 2012/0176569 A1 Jul. 12, 2012

Related U.S. Application Data

(62) Division of application No. 12/534,219, filed on Aug. 3, 2009, now abandoned.

(30) Foreign Application Priority Data

Aug. 7, 2008 (JP) ................................ 2008-204727

(51) Int. Cl.
*G02F 1/133* (2006.01)
*G02F 1/1333* (2006.01)
*H01G 2/08* (2006.01)
*H02B 1/00* (2006.01)

(52) U.S. Cl.
USPC .............. 349/161; 349/72; 361/514; 361/676

(58) Field of Classification Search
USPC .............................. 349/72, 161; 361/514, 676
See application file for complete search history.

(56) References Cited

U.S. PATENT DOCUMENTS

| 5,886,763 | A | 3/1999 | Wolkowicz et al. |
| 6,211,852 | B1 | 4/2001 | Oono et al. |
| 7,023,519 | B2 | 4/2006 | Ho et al. |
| 2002/0089638 | A1 | 7/2002 | Ho et al. |
| 2003/0011735 | A1* | 1/2003 | Kato .............................. 349/149 |
| 2004/0184211 | A1 | 9/2004 | Bender et al. |

FOREIGN PATENT DOCUMENTS

| GB | 2 360 851 | 7/2003 |
| GB | 2 361 775 | 1/2004 |
| JP | 56-128618 | 9/1981 |
| JP | 59-192122 | 12/1984 |
| JP | 62-166039 | 10/1987 |
| JP | 06-011689 | 1/1994 |
| JP | 6-301019 | 10/1994 |
| JP | 11-038391 | 2/1999 |

(Continued)

OTHER PUBLICATIONS

Japanese Office Action dated May 6, 2010, issued in corresponding Japanese Application No. 2008-204727, with English Translation.

(Continued)

*Primary Examiner* — Lauren Nguyen
(74) *Attorney, Agent, or Firm* — Nixon & Vanderhye P.C.

(57) ABSTRACT

A liquid crystal display device includes a panel, a heater, and a temperature detector. The panel includes substrates, electrodes and liquid crystal. The electrodes and the liquid crystal are disposed between the substrates. The heater has a transparent heating member, and the heating member emits heat by being supplied with electricity. At least a part of the heating member of the heater is located to overlap with a display area of the panel in a thickness direction of the substrates. A temperature detecting portion of the temperature detector and the heating member of the heater are located adjacent to each other.

14 Claims, 11 Drawing Sheets

FOREIGN PATENT DOCUMENTS

| | | | |
|---|---|---|---|
| JP | 2000-047247 | 2/2000 | |
| JP | 2001-100685 | 4/2001 | |
| JP | 2002-328393 | 11/2002 | |
| JP | 2004-037535 | 2/2004 | |
| JP | 2005-215334 | 8/2005 | |
| JP | 2005-215334 | * 11/2005 | ................ 1/133 |
| JP | 2006-113158 | 4/2006 | |
| JP | 2007-311047 | * 11/2007 | |

OTHER PUBLICATIONS

Office Action issued in U.S. Appl. No. 12/534,219 on Aug. 9, 2011.
Final Rejection issued in U.S. Appl. No. 12/534,219 on Nov. 16, 2011.

* cited by examiner

IMAGE (n-1)

IMAGE UPDATING

IMAGE (n)

LIQUID CRYSTAL DISPLAY DEVICE WITH HEATER

CROSS-REFERENCE TO RELATED APPLICATIONS

This Application is a divisional of U.S. Application No. 12/534,219, filed Aug. 3, 2009 now abandoned, which claims the benefit of Japanese Patent Application No. 2008-204727 filed Aug. 7, 2008, the disclosure of both of which is incorporated herein by reference in its entirety.

BACKGROUND OF THE INVENTION

1. Field of the Invention

The present invention relates to a liquid crystal display device.

2. Description of Related Art

JP-A-2004-037535 or JP-U-56-128618 discloses a liquid crystal display device having a panel heater located on a back side of a liquid crystal display panel. Liquid crystal sealed in the liquid crystal display panel is conditioned by being heated through the panel heater.

JP-U-56-128618 further discloses a temperature detector located adjacent to the liquid crystal display panel. The temperature detector detects ambient temperature of the liquid crystal display panel. When the temperature detector detects the ambient temperature to be low, the panel heater is activated.

However, in a case that the temperature detector is located adjacent to the liquid crystal display panel, the temperature detector is disposed on a substrate of the liquid crystal display panel, for example. Thus, when the heater is activated, heat is transmitted from the heater to the temperature detector through the substrate of the liquid crystal display panel. Because the substrate is typically made of transparent glass or resin having relatively large thermal capacity, it takes certain time to transmit heat from the heater to the temperature detector. Therefore, when liquid crystal is heated by the heater, heat transmission from the heater to the temperature detector is delayed. Thus, detection accuracy may become low, because it is difficult for the temperature detector to immediately detect temperature increasing when the heater is activated.

When the detection accuracy is lowered, liquid crystal may be overheated, because a controllability of the heater is lowered. When liquid crystal is overheated, a contrast of the liquid crystal display panel may be lowered, and a control circuit located adjacent to the overheated liquid crystal may be affected. Thus, a display quality of the liquid crystal display panel may be lowered.

SUMMARY OF THE INVENTION

In view of the foregoing and other problems, it is an object of the present invention to provide a liquid crystal display device.

According to an example of the present invention, a liquid crystal display device includes a liquid crystal display panel, a heater, and a temperature detector. The liquid crystal display panel includes a first substrate, a second substrate opposing to the first substrate, a plurality of electrodes disposed between the first substrate and the second substrate, and liquid crystal sealed between the first substrate and the second substrate. The heater has a transparent heating member disposed opposite from the electrodes through the first substrate, and the heating member emits heat by being supplied with electricity. At least a part of the heating member is located to overlap with a display area of the liquid crystal display panel in a thickness direction of the substrates. The temperature detector has a temperature detecting portion. The temperature detecting portion of the temperature detector and the heating member of the heater are located adjacent to each other.

Accordingly, a display quality of the liquid crystal display device can be improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT (First Embodiment)

Figure 1:
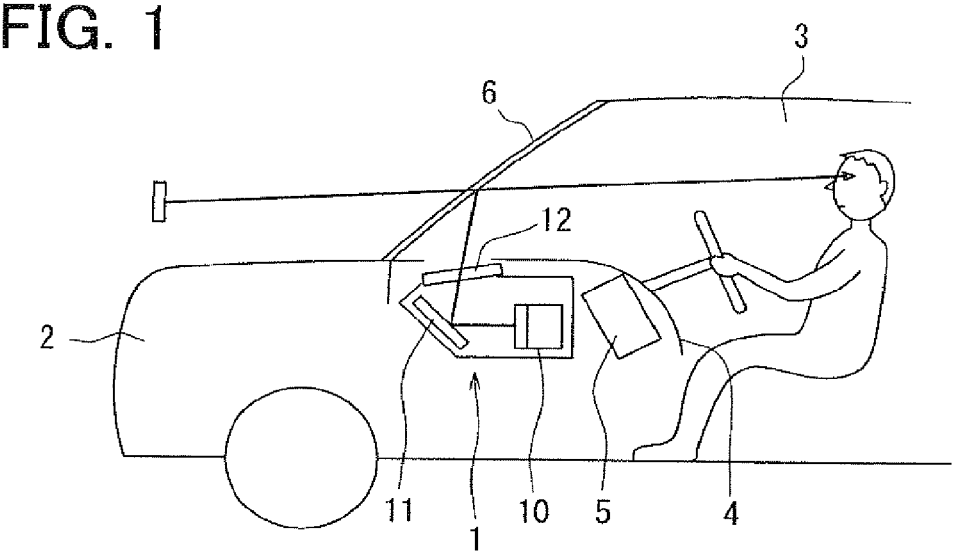
FIG. 1 is a schematic view illustrating a display device according to a first embodiment.

A head-up display device (HUD) 1 according to a first embodiment is shown in FIG. 1.

The HUD 1 is mounted on a vehicle 2, and is located in an instrument panel 4 disposed in a front area of a passenger compartment 3. A meter 5 displays vehicle information, and the HUD 1 is disposed on a front side of the meter 5 in a front-and-rear direction of the vehicle 2.

The HUD 1 includes an annunciator 10, a reflecting mirror 11, and a dustproof cover 12, for example. The annunciator 10 forms an image of vehicle information. The mirror 11 introduces fight of the image to a windshield 6 of the vehicle 2 through the cover 12. The windshield 6 is located on a frond side of the passenger compartment 3. Thus, the light of the image incident on the windshield 6 forms an image on an inner surface of the windshield 6, and the formed image is displayed as a virtual image.

Figure 2:
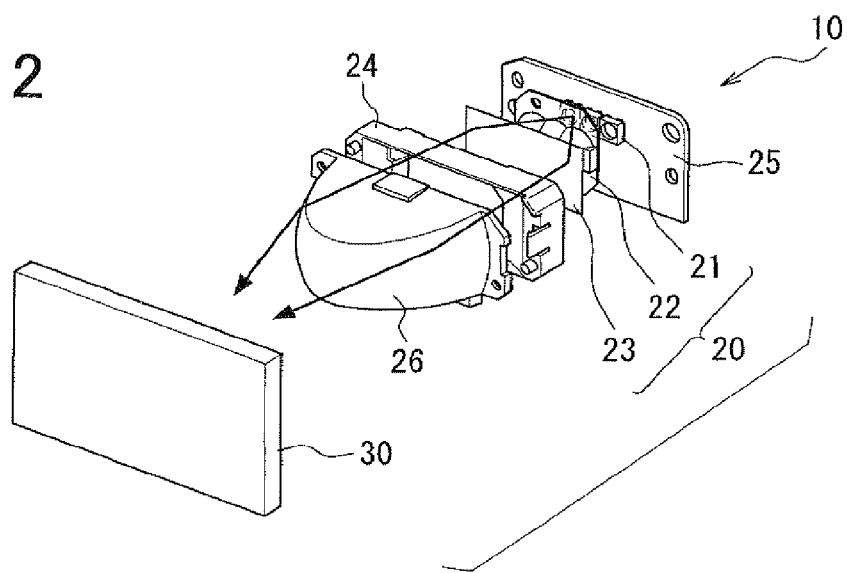
FIG. 2 is an exploded perspective view illustrating a part of an annunciator of the display device.
Figure 3:
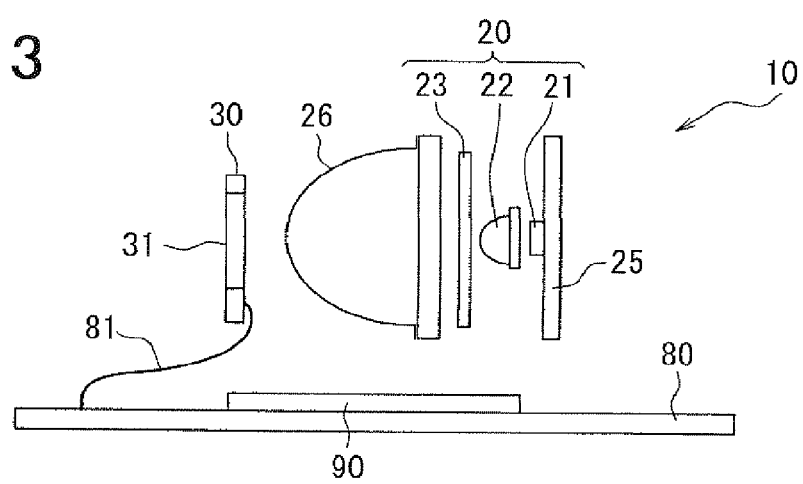
FIG. 3 is an exploded side view illustrating a part of the annunciator of the display device.

FIG. 2 is an exploded perspective view illustrating a part of the annunciator 10 shown in FIG. 1, and FIG. 3 is an exploded side view illustrating a part of the annunciator 10 shown in FIG. 1.

The annunciator 10 includes a backlight 20, a projection lens 26, and a liquid crystal panel 30.

The backlight 20 includes a light source 21, a light gathering lens 22, and a diffusion board 23, which are arranged in a casing 24.

The light source 21 is a light-emitting diode, for example. Alternatively, the light source 21 may be a xenon lamp, a fluorescent display tube, or a cold-cathode tube. The light source 21 is mounted on a print board 25 provided for the light source 21, and is electrically connected to a controller 90 mounted on a print board 80. As shown in FIG. 3, the light gathering lens 22 is a convex lens having a convex cross-section. The light source 21 emits light in a wide area, and the light gathering lens 22 gathers the light so as to output the gathered light toward the diffusion board 23. The diffusion board 23 has a light emitting face opposite from the light gathering lens 22. The diffusion board 23 diffuses the light output from the light gathering lens 22, and outputs the diffused light toward the projection lens 26 through the light emitting face. The light emitting face has a flat shape, and is able to emit uniform light having less luminance variation.

The projection lens 26 is made of a material having high refractive index, such as resin. The projection lens 26 is located between the backlight 20 and the liquid crystal panel 30. Light output from the diffusion board 23 is incident on the projection lens 26 opposing to the backlight 20. The projection lens 26 gathers light output from the backlight 20, and projects the gathered light toward the liquid crystal panel 30.

The liquid crystal panel 30 has a screen 31 opposite from the projection lens 26, and the screen 31 forms an image corresponding to a signal output from outside. The liquid crystal panel 30 is electrically connected to the controller 90 through the print board 80 and a flexible print board 81. The controller 90 forms a display signal, and sends the display signal toward the liquid crystal panel 30. The liquid crystal panel 30 is a transmission-type panel, and is illuminated by transmitting light projected by the projection lens 26. The transmitted light forms a display image on the screen 31, and the liquid crystal panel 30 outputs the display image to the mirror 11 shown in FIG. 1.

Figure 4:
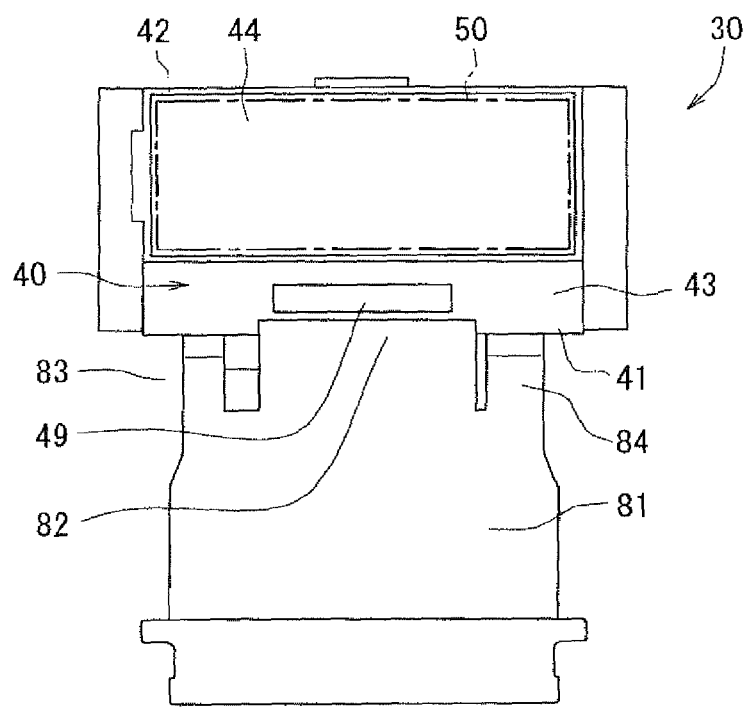
FIG. 4 is a front view illustrating a liquid crystal panel of the annunciator.
Figure 5:
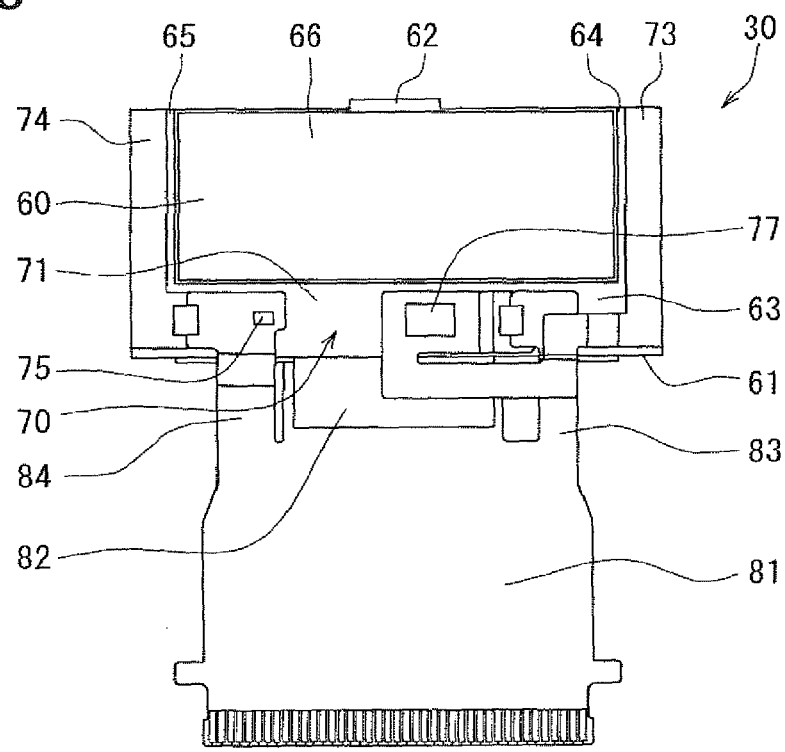
FIG. 5 is a back view illustrating the liquid crystal panel.
Figure 6:
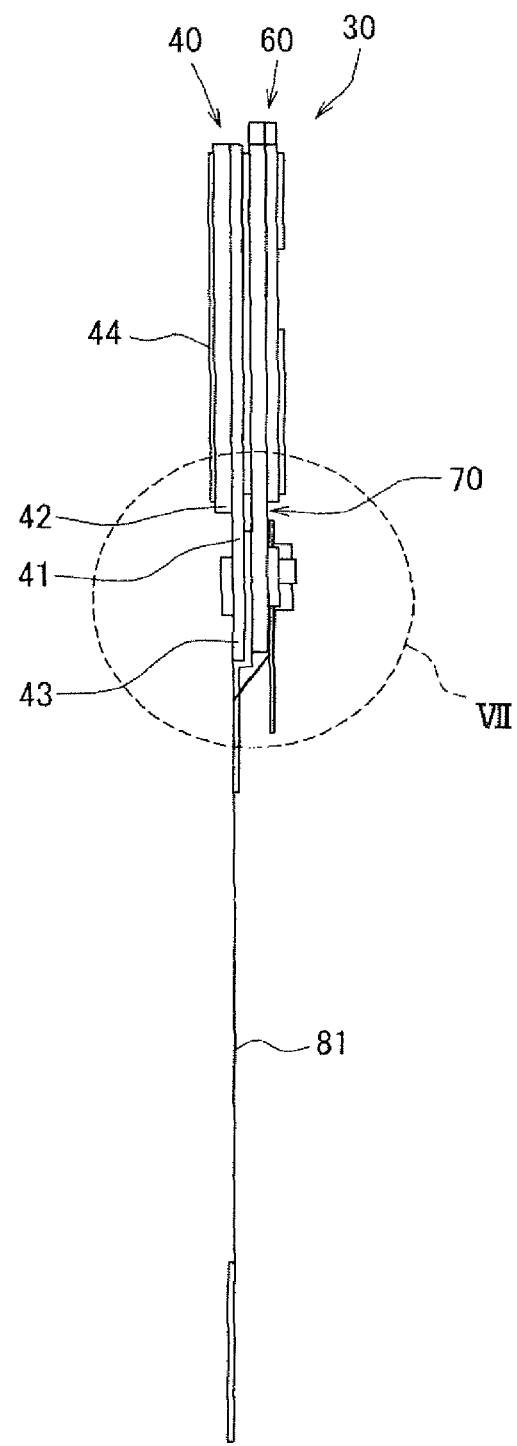
FIG. 6 is a side view illustrating the liquid crystal panel.

The liquid crystal panel 30 will be described with reference to FIGS. 4-7. FIG. 4 is a front view of the liquid crystal panel 30 opposite from the projection lens 26, and FIG. 5 is a back view of the liquid crystal panel 30 opposing to the projection lens 26. FIG. 6 is a side view of the liquid crystal panel 30, and FIG. 7 is an enlarged cross-sectional view of the liquid crystal panel 30 shown in FIG. 6.

The liquid crystal panel 30 is a double cell super twisted nematic (DSTN) type liquid crystal panel, for example. As shown in FIG. 6, the liquid crystal panel 30 includes a liquid crystal display panel 40, a compensating panel 60, and a heater 70. The liquid crystal display panel 40 and the compensating panel 60 are connected to each other through an adhesive agent or an adhesive tape, for example. The liquid crystal panel 30 is disposed such that the compensating panel 60 opposes to the projection lens 26.

The liquid crystal display panel 40 includes a first translucent substrate 41, a second translucent substrate 42, a spacer 45, and liquid crystal 46. The first substrate 41 and the second substrate 42 oppose to each other. As shown in FIG. 4, the translucent substrate 41, 42 has a rectangular shape, and is made of glass, for example. As shown in FIG. 6, the first substrate 41 opposes to the compensating panel 60, and an up-and-down dimension of the first substrate 41 is longer than that of the second substrate 42.

Figure 7:
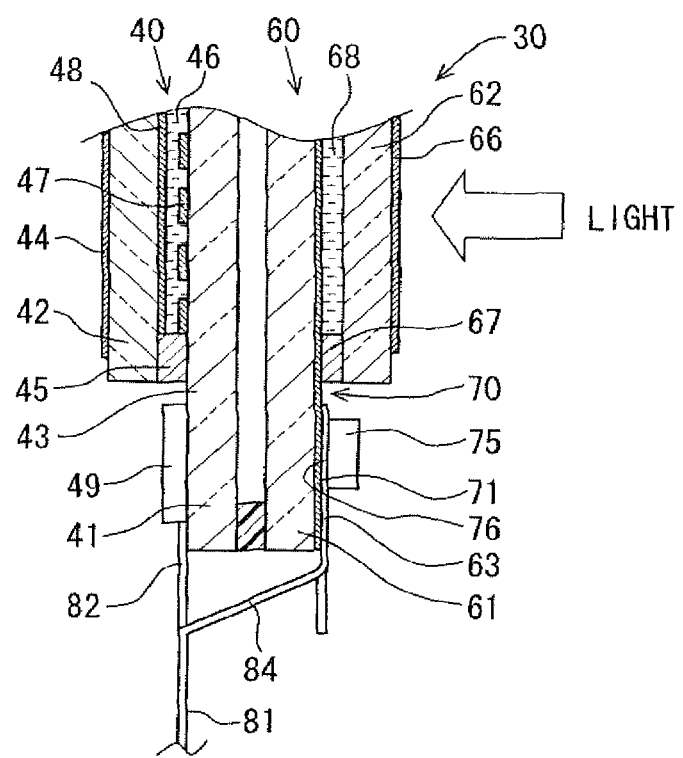
FIG. 7 is an enlarged cross-sectional view illustrating the liquid crystal panel of FIG. 6.

As shown in FIG. 7, the first substrate 41 has a protrusion 43 protruding from a lower end of the second substrate 42. The second substrate 42 has a first face opposing to the first substrate 41, and transparent electrodes are disposed between the first substrate 41 and the second substrate 42. The second substrate 42 has a second face opposite from the first face, and a polarizing board 44 is disposed on the second face of the second substrate 42. That is, the polarizing board 44 is disposed on a face of the screen 31 of the liquid crystal panel 30.

As shown in FIG. 7, the spacer 45 is disposed between the translucent substrates 41, 42, and is located on an outer periphery of the second substrate 42. The liquid crystal 46 is sealed in a space defined among the translucent substrates 41, 42, and the spacer 45.

The translucent substrates 41, 42 oppose to each other. A face of the first substrate 41 opposing to the second substrate 42 has the transparent electrode 47, and a face of the second substrate 42 opposing to the first substrate 41 has the transparent electrode 48. The electrode 47, 48 is made of indium tin oxide (ITO), and has plural band shapes. The electrodes 47, 48 are perpendicular to each other, seen in a thickness direction of the translucent substrate 41, 42.

The protrusion 43 has a first terminal (not shown) connected to the transparent electrodes 47, 48, and the protrusion 43 has a second terminal (not shown) connected to a center part of the flexible print board 81. A driving circuit 49 is mounted on the protrusion 43. The driving circuit 49 receives a display signal generated in the controller 90 through the flexible print board 81 and the second terminal, and sends a driving signal corresponding to the display signal to the transparent electrodes 47, 48 through the first terminal.

The compensating panel 60 includes a first translucent substrate 61, a second translucent substrate 62, a spacer 67, and liquid crystal 68. As shown in FIG. 5, the translucent substrate 61, 62 has a rectangular shape, and is made of glass, for example. An up-and-down dimension of the first substrate 61 opposing to the liquid crystal display panel 40 is longer than that of the second substrate 62. A left-and-right dimension of the first substrate 61 is longer than that of the second substrate 62.

As shown in FIG. 5, the first substrate 61 has a first protrusion 63 protruding from a lower end of the second substrate 62. The second substrate 62 further has a second protrusion 64, 65 protruding from a lateral end of the second substrate 62. The second substrate 62 of the compensating panel 60 has approximately the same size as the second substrate 42 of the liquid crystal display panel 40. The translucent substrates 61, 62 are located so as to overlap with each other in a thickness direction. A polarizing board 66 is disposed on a face of the second substrate 62 opposite from the first substrate 61.

As shown in FIG. 7, the spacer 67 is disposed between the translucent substrates 61, 62, and is located on an outer periphery of the second substrate 62. The liquid crystal 68 is sealed in a space defined among the translucent substrates 61, 62, and the spacer 67.

A heating member 71 is disposed on a face of the first substrate 61 opposing to the second substrate 62, and is made of the same material as the transparent electrode 47, 48. That is, the heating member 71 may be made of ITO, for example. The heating member 71 is arranged all of the face of the first substrate 61 opposing to the second substrate 62. When electricity is supplied, the heating member 71 emits heat. The liquid crystal 46 located in a display area 50 of the liquid crystal display panel 40 shown in FIG. 4 can be approximately uniformly heated by the heating member 71.

The heater 70 is constructed of the first translucent substrate 61 and the heating member 71. The first substrate 61 of the compensating panel 60 may be a supporting board for supporting the heating member 71. Because the first translucent substrate 61 of the compensating panel 60 constructs a part of the heater 70 as the supporting board, a thickness of the liquid crystal panel 30 can be made thinner. Further, the heater 70 can be used for a different type liquid crystal display panel, in a case that the heater 70 is not integrated with the liquid crystal display panel 40. However, the heater 70 may be integrated with the liquid crystal display panel 40.

As shown in FIG. 5, a heater connector 73, 74 is connected to the heating member 71 formed on the second protrusion 64, 65. The heater connector 73, 74 supplies electricity to the heating member 71. The heater connector 73, 74 is constructed of a flexible print board having a band shape, and is connected to the heating member 71 through a conductive adhesive.

As shown in FIG. 5, the flexible print board 81 has a center end portion 82, a right end portion 83, and a left end portion 84, which are connected to the liquid crystal panel 30. The center end portion 82 is connected to the driving circuit 49 shown in FIG. 4. The right end portion 83 is connected to the heater connector 73 through solder, and the left end portion 84 is connected to the heater connector 74 through solder.

As shown in FIG. 7, the left end portion 84 of the flexible print board 81 is disposed on the heating member 71 formed on the first protrusion 63. A thermistor 75 is connected to a face of the left end portion 84 through an adhesive, for example. The thermistor 75 may correspond to a temperature detector. A temperature detecting portion 76 of the thermistor 75 opposes to the heating member 71, and is located adjacent to the heating member 71. The thermistor 75 has a relatively small thermal capacity, and is used as a detector for measuring temperature.

Due to the location of the thermistor 75, heat emitted from the heating member 71 can be immediately detected by the thermistor 75, compared with a case in which a thermistor is located on a translucent substrate of a liquid crystal panel. The flexible print board 81 is thinner than a translucent substrate, and a thermal capacity of the flexible print board 81 is relatively smaller than that of a translucent substrate.

The thermistor 75 is located adjacent to the heating member 71 arranged outside of the display area 50 of the liquid crystal display panel 40. Therefore, if the liquid crystal panel 30 is a transmission type panel, temperature can be detected without affecting an image displayed on the liquid crystal panel 30.

An end portion of the heater connector 73 to be connected to the right end portion 83 of the flexible print board 81 is also disposed on the heating member 71 formed on the first protrusion 63. As shown in FIG. 5, a temperature fuse 77 is arranged on a face of the end portion of the heater connector 73. The temperature fuse 77 and the heating member 71 are connected in series through the heater connector 73. In a case that a malfunction is generated in the heater 70 or the controller 90 controlling the heater 70, when the heating member 71 is overheated, the temperature fuse 77 detects the overheat of the heating member 71. Thus, electricity supplied to the heating member 71 can be forcibly stopped.

Figure 8:
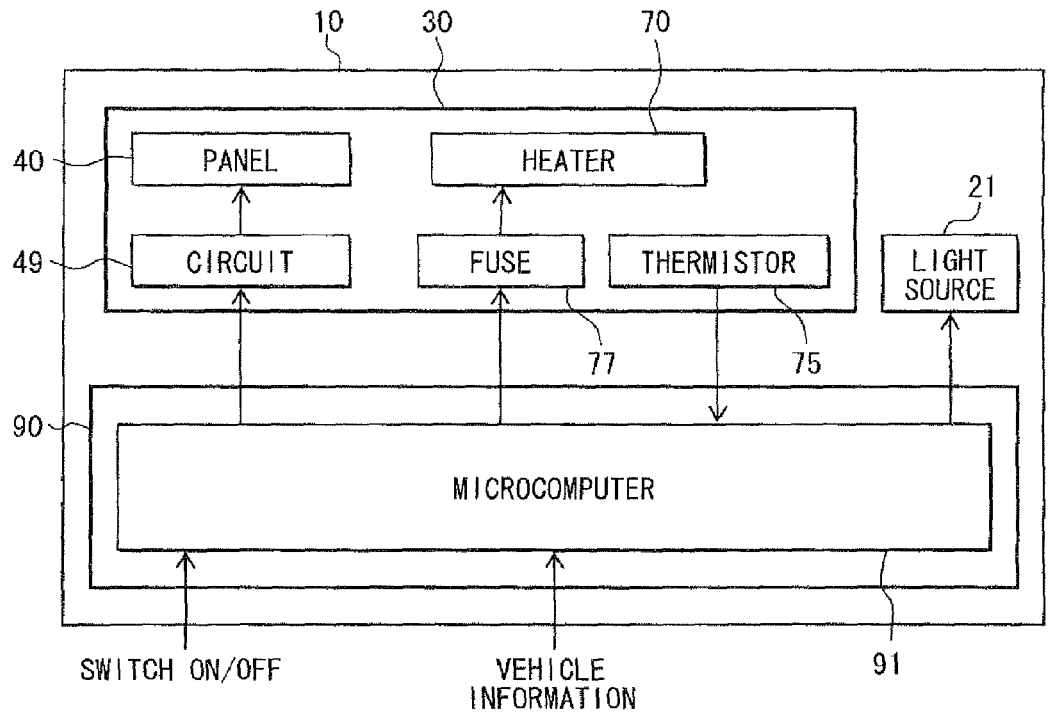
FIG. 8 is a circuit diagram illustrating a controlling of the display device.

As shown in FIG. 8, the controller 90 has a microcomputer 91 for driving and controlling the HUD 1. The microcomputer 91 has a CPU, a RAM, and a ROM, for example. The CPU performs calculations so as to control the liquid crystal panel 30, the light source 21, and the heater 70. The RAM temporally stores calculation results, temperature data output from the thermistor 75, switching instructions for turning on/off the HUD 1 input from outside, and a variety of vehicle information such as a vehicle velocity. Control programs necessary for controlling the HUD 1 is memorized in the ROM, and the CPU performs calculations based on the control programs.

A variety of sensors for obtaining vehicle information are connected to an input side of the microcomputer 91 through an interface (not shown). The sensors output the vehicle information about the thermistor 75, the switching instructions of the HUD 1, and the vehicle velocity, for example. The light source 21 is connected to an output side of the microcomputer 91. The liquid crystal display panel 40 is connected to the output side of the microcomputer 91 through the driving circuit 49. The heater 70 is connected to the output side of the microcomputer 91 through the temperature fuse 77.

The microcomputer 91 generates a display signal of a display image for the annunciator 10, and outputs the display signal into the driving circuit 49. When the driving circuit 49 receives the display signal, the driving circuit 49 controls electricity supply for the transparent electrode 47, 48 disposed on the translucent substrate 41, 42, based on the display signal. The microcomputer 91 generates a driving signal, and outputs the driving signal into a driving circuit (not shown) so as to make the light source 21 to emit light. The driving circuit controls electricity supply for the light source 21 based on the driving signal. Further, the microcomputer 91 generates a driving signal for controlling the heater 70, and outputs the driving signal into a driving circuit (not shown). The driving circuit controls electricity supply for the heating member 71 of the heater 70 based on the driving signal.

A controlling of the heater 70 of the HUD 1 will be described with reference to FIG. 9.

Figure 9:
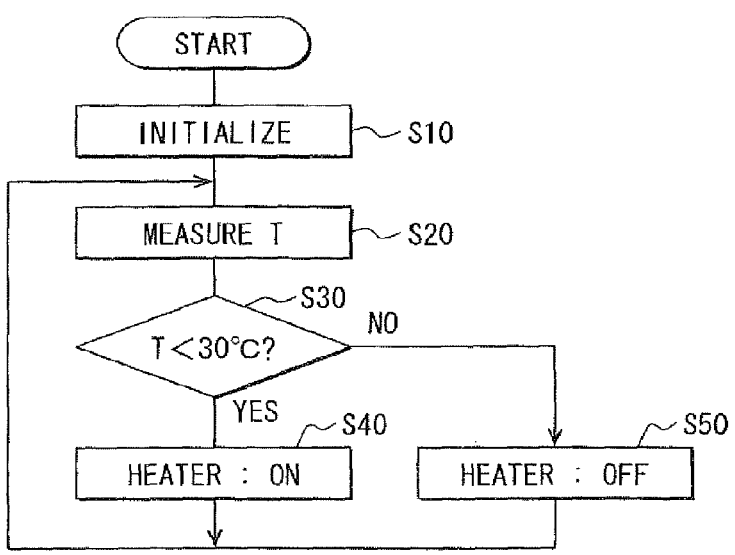
FIG. 9 is a flowchart illustrating a controlling of a heater of the liquid crystal panel.

When a switch of the HUD 1 is turned on, the controller 90 starts a control flow shown in FIG. 9, and performs a predetermined initialization at S10.

A liquid crystal temperature T is measured at S20. Specifically, the liquid crystal temperature T is measured based on temperature data input into the controller 90 from the thermistor 75. Because the liquid crystal temperature T cannot directly be measured, the liquid crystal temperature T is estimated based on the temperature data input from the thermistor 75.

For example, a map or a calculation formula is prepared by performing experiments so as to define a relationship between the temperature data input from the thermistor 75 and the liquid crystal temperature T. The prepared map or calculation formula is stored in the ROM of the controller 90. The estimation of the liquid crystal temperature T may be performed by using the map or the calculation formula. The liquid crystal temperature T may be measured by a single data input from the thermistor 75. Alternatively, an averaging process may be performed relative to multiple data. Accuracy for measuring the liquid crystal temperature T may be improved by multiple sampling of temperature data.

The measured liquid crystal temperature T is determined to be lower than a predetermined value such as 30° C. or not, at S30. The annunciator 10 of the HUD 1 receives a variety of influences from the liquid crystal temperature T. For example, when the liquid crystal temperature T becomes low, response time period needed for displaying a display image on the annunciator 10 becomes long. If the display image is changed from a first image to a second image, the first image and the second image may overlap with each other during the response time period. For example, if information changing from moment to moment such as vehicle velocity is displayed as the display image, a vehicle driver may not be able to recognize the display image.

In contrast, when the liquid crystal temperature T becomes high, a contrast of the display image is lowered. Further, peripheral devices such as the controller 90 may be affected. When the predetermined value is defined to be 30° C., a display quality can be maintained to be high relative to the liquid crystal 46. However, the predetermined value is not limited to 30° C. The predetermined value may be changed in consideration of temperature characteristics of liquid crystal.

When the liquid crystal temperature T is determined to be lower than the predetermined value (YES at S30), the controller 90 outputs a driving signal for activating the heater 70 into the driving circuit of the heater 70, at S40. The driving circuit supplies electricity corresponding to the driving signal to the heating member 71. Thus, the heating member 71 emits heat corresponding to the supplied electricity so as to heat the liquid crystal 46.

When the liquid crystal temperature T is determined to be equal to or higher than the predetermined value (NO at S30), the controller 90 stops outputting the driving signal so as to stop the heater 70, at S50. When the controller 90 stops outputting the driving signal into the driving circuit, the electricity supplied to the heating member 71 is stopped by the driving circuit.

When S40 or S50 is ended, a liquid crystal temperature T is again measured at S20. The control flow shown in FIG. 9 is repeatedly performed until the switch of the HUD 1 is turned off.

The thermistor 75 is located adjacent to the heating member 71 of the heater 70, not adjacent to the first translucent substrate 41 of the liquid crystal display panel 40. Thus, the thermistor 75 can immediately detect temperature increasing after the heating member 71 starts heating. Therefore, a response time period needed for the thermistor 75 to respond to the temperature increasing can be shortened, compared with a case in which the first translucent substrate 41 having a relatively large thermal capacity is disposed between the thermistor 75 and the heating member 70.

Further, because the temperature detecting portion 76 of the thermistor 75 is located adjacent to the heating member 71, the temperature detecting portion 76 is difficult to be affected by outside air temperature. Thus, disturbance for the thermistor 75 can be reduced. Accordingly, detection accuracy of the liquid crystal temperature T can be improved.

Therefore, overheat of the liquid crystal 46 can be restricted, because controllability of the heater 70 can be improved. Further, because the response time period of the thermistor 75 is shortened, when a heating amount of the heating member 71 is increased, the heater 70 can be controlled without overheating the liquid crystal 46. Thus, the liquid crystal temperature T can be rapidly increased to a proper range in accordance with the increased heating amount. Accordingly, a display quality of the liquid crystal display panel 40 can be much improved.

Updating of an image displayed by the HUD 1 will be described with reference to FIGS. 10-14.

Figure 10:
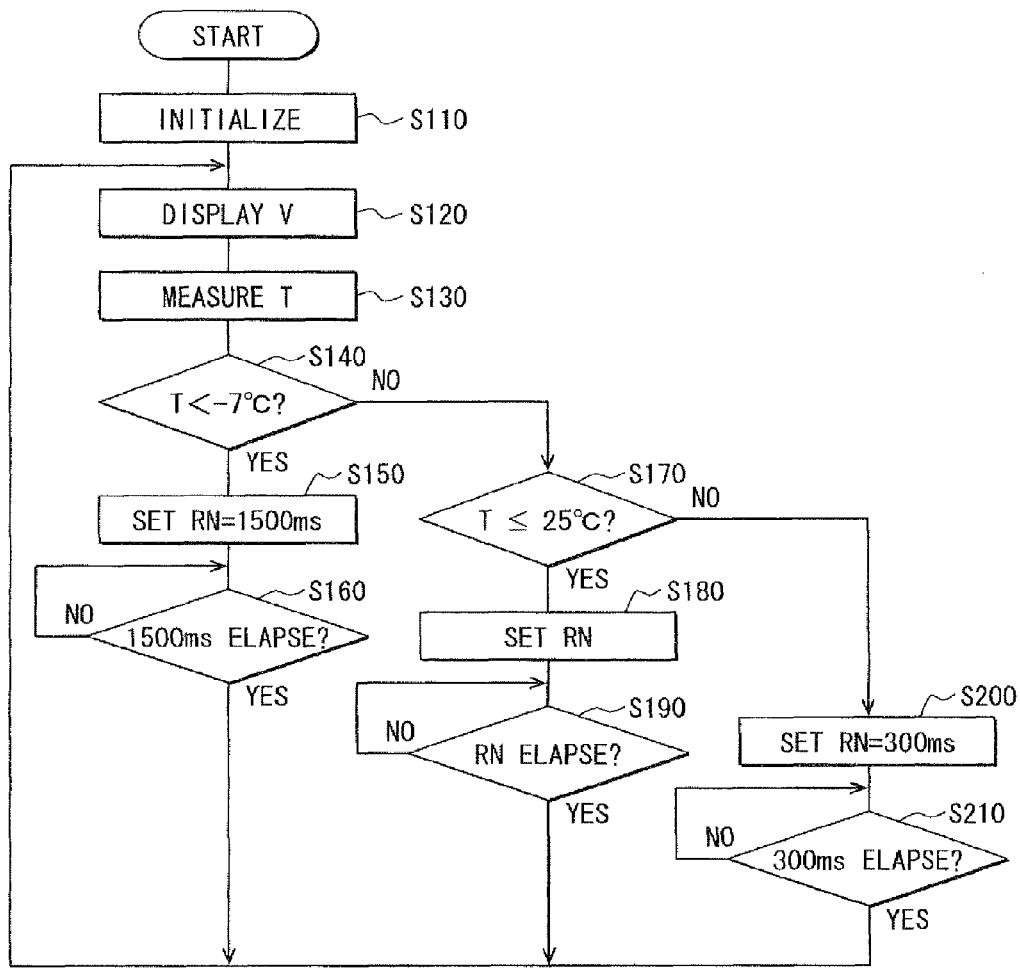
FIG. 10 is a flowchart illustrating an updating of an image displayed by the display device.
Figure 11:
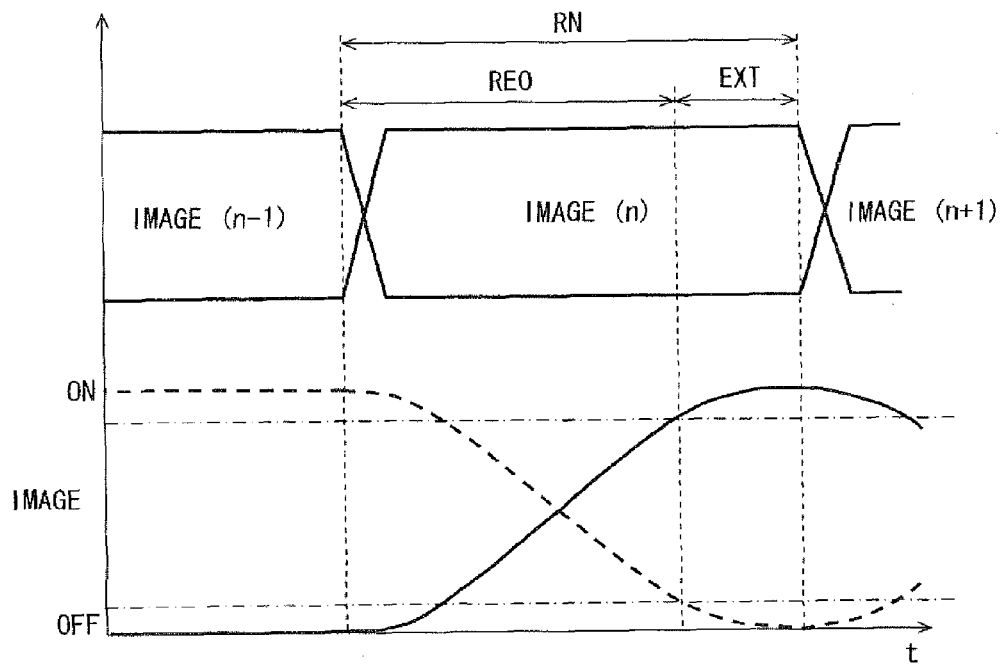
FIG. 11 is a time chart illustrating the updating of the image.
Figure 12:
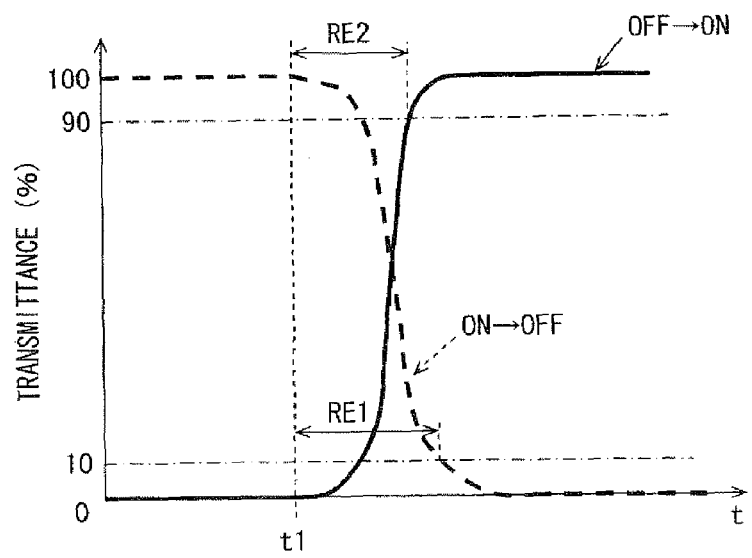
FIG. 12 is a time chart illustrating a response time period of liquid crystal of the liquid crystal panel.
Figure 13:
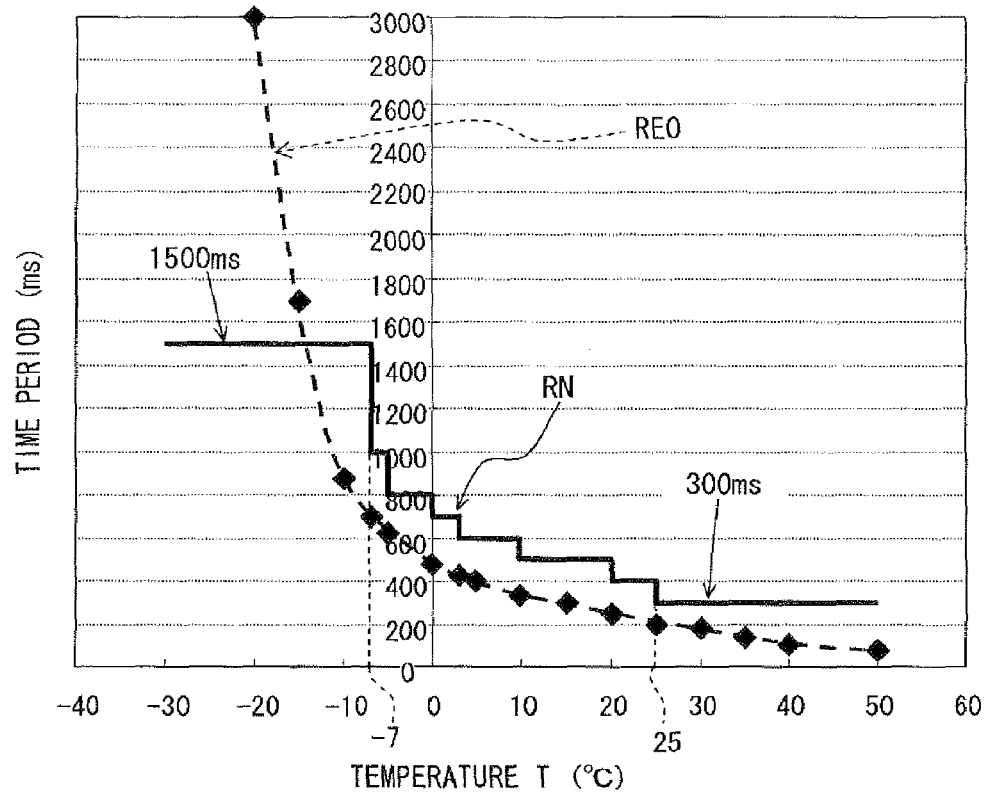
FIG. 13 is a graph illustrating a relationship between a liquid crystal temperature and the response time period, and a relationship between the liquid crystal temperature and an updating time period.
Figure 14A:
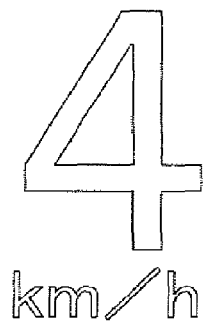
FIG. 14A is an example of the image before updating.
Figure 14B:
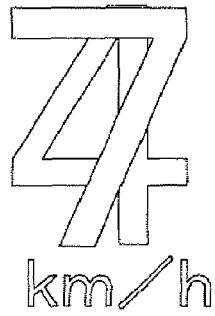
FIG. 14B is an example of the image during the updating.
Figure 14C:
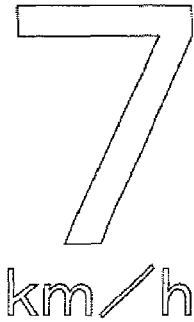
FIG. 14C is an example of the image after the updating.

FIG. 10 is a flowchart illustrating an updating of an image displayed by the HUD 1. FIG. 11 is a time chart illustrating the updating of the image. FIG. 12 is a time chart illustrating a display response time period RE0. FIG. 13 is a graph illustrating a relationship between the liquid crystal temperature T and the display response time period RED, and a relationship between the liquid crystal temperature T and a display updating time period RN. FIG. 14A is an example of the image before updating, FIG. 14B is an example of the image during the updating, and FIG. 14C is an example of the image after the updating.

When a switch of the HUD 1 is turned on, the controller 90 starts a control flow shown in FIG. 10 at an approximately the same timing as the control flow shown in FIG. 9, and performs a predetermined initialization at S110.

The controller 90 sends a display signal for displaying an image to the driving circuit 49, at S120. For example, information of a vehicle velocity V is input into the annunciator 10, and the image corresponds to the information of the vehicle velocity V.

A liquid crystal temperature T is measured at S130. Specifically, the liquid crystal temperature T is measured based on temperature data input into the controller 90 from the thermistor 75. Because the liquid crystal temperature T cannot directly be measured, the liquid crystal temperature T is estimated based on the temperature data input from the thermistor 75.

For example, a map or a calculation formula is prepared by performing experiments so as to define a relationship between the temperature data input from the thermistor 75 and the liquid crystal temperature T. The prepared map or calculation formula is stored in the ROM of the controller 90. The estimation of the liquid crystal temperature T may be performed by using the map or the calculation formula. The liquid crystal temperature T may be measured by a single data input from the thermistor 75. Alternatively, an averaging process may be performed relative to multiple data. Accuracy for measuring the liquid crystal temperature T may be improved by multiple sampling of temperature data.

The updating time period RN is determined in correspondence with the liquid crystal temperature T measured in S130, after S130 is performed. As shown in FIG. 11, the updating time period RN is defined as a time period started when a display of an image (n) is instructed and ended when a display of an image (n+1) is instructed. The updating time period RN is determined based on the response time period RED.

The response time period RED and the updating time period RN will be specifically described.

FIG. 12 is a time chart representing a transmittance when the liquid crystal display panel 40 is turned on/off. The transmittance is defined to be 100% when the liquid crystal display panel 40 is stable after being turned on, and is defined to be 0% when the liquid crystal display panel 40 is stable after being turned off.

As shown in a broken line of FIG. 12, after the liquid crystal display panel 40 is turned off at a timing t1, the transmittance is gradually decreased to 0%. As shown in a solid line of FIG. 12, after the liquid crystal display panel 40 is turned on at the timing t1, the transmittance is gradually increased to 100%.

A response time period RE1 represents a period started when the panel 40 is turned off and ended when the transmittance is decreased to 10%, and a response time period RE2 represents a period started when the panel 40 is turned on and ended when the transmittance is increased to 90%. When the period RE1 is longer than the period RE2, the response time period RE0 is equal to the period RE1. When the period RE2 is longer than the period RE1, the response time period RE0 is equal to the period RE2. In FIG. 12, the response time period RE0 is equal to the period RE1, because the period RE1 is longer than the period RE2.

The response time period RED is changed in accordance with the liquid crystal temperature T. As shown in a broken line of FIG. 13, as the liquid crystal temperature T is lowered, the response time period RE0 is increased. As the liquid crystal temperature T is raised, the response time period RE0 is decreased.

As shown in FIG. 11, the updating time period RN is described as an example in a case that an image (n−1) is updated to an image (n). The display updating time period RN is defined to start when an erasion of the image (n−1) and a display of the image (n) are instructed. The display updating time period RN is defined to end when an erasion of the image (n) and a display of an image (n+1) are instructed. The instructions are sent by the controller 90 through the display signals.

The liquid crystal temperature T is determined to be lower than −7° C. or not, at S140 of FIG. 10. When the liquid crystal temperature T is determined to be lower than −7° C. (YES at S140), the flowchart proceeds to S150. In this case, as shown in FIG. 13, the display response time period RE0 of the liquid crystal 46 is relatively long.

The display updating time period RN is set to be 1500 ms, at S150. After the display updating time period RN is set to be 1500 ms, a time period of 1500 ms is determined to elapse or not, at S160. If the time period of 1500 ms is determined not to elapse (NO at S160), S160 is repeatedly performed.

If the time period of 1500 ms is determined to elapse (YES at S160), the flowchart returns to S120. The annunciator 10 forms an image corresponding to information of a vehicle velocity V at the moment, at S120. Specifically, the controller 90 sends a signal instructing an erasion of the image (n−1) and a display of the image (n) into the driving circuit 49, such that the image (n−1) is updated to the image (n) corresponding to the vehicle velocity V at the moment, as shown in FIG. 11.

When the liquid crystal temperature T is determined to be equal to or higher than −7° C. (NO at S140), the flowchart proceeds to S170.

The liquid crystal temperature T is determined to be equal to or lower than 25° C. or not, at S170. When the liquid crystal temperature T is determined to be equal to or higher than −7° C. and when the liquid crystal temperature T is determined to be equal to or lower than 25° C. (YES at S170), the flowchart proceeds to S180.

As shown in FIG. 13, the display updating time period RN is set to change in accordance with the liquid crystal temperature T. In a temperature range between −7° C. and 25° C., as shown in FIG. 11, the display updating time period RN is defined by adding a predetermined extension period EXT to the response time period RE0. The updating time period RN is changed stepwise in FIG. 13. Alternatively, the updating time period RN may be changed not stepwise, if the updating time period RN is defined by adding the predetermined extension period EXT to the response time period RED.

The display updating time period RN is stored in the ROM of the microcomputer 91 of the controller 90. Alternatively, the display updating time period RN may be required by calculation. For example, in the temperature range between −7° C. and 25° C., the display response time period RE0 may be stored in the ROM, and the display updating time period RN may be defined by adding the predetermined extension period EXT to the display response time period RED.

After the display updating time period RN is set at S130 of FIG. 10, the display updating time period RN is determined to elapse or not, at S190. If the display updating time period RN is determined not to elapse (NO at S190), S190 is repeatedly performed.

If the display updating time period RN is determined to elapse (YES at S190), the flowchart returns to S120. The annunciator 10 forms an image corresponding to information of a vehicle velocity V at the moment, at S120.

When the liquid crystal temperature T is determined to be higher than 25° C. (NO at S170), the flowchart proceeds to S200.

The display updating time period RN is set to be 300 ms, at S200. After the updating time period RN is set to be 300 ms, a time period of 300 ms is determined to elapse or not, at S210. If the time period of 300 ms is determined not to elapse (NO at S210), S210 is repeatedly performed.

If the time period of 300 ms is determined to elapse (YES at S210), the flowchart returns to S120. The annunciator 10 forms an image corresponding to information of a vehicle velocity V at the moment, at S120.

Display state of the annunciator 10 will be described in accordance with temperature ranges, when the control flow of FIG. 10 is performed.

When the liquid crystal temperature T is equal to or higher than −7° C. and when the liquid crystal temperature T is equal to or lower than 25° C., the liquid crystal 46 is relatively stable, and the display updating time period RN is defined by adding the predetermined extension period EXT to the display response time period RED.

The image (n−1) and the image (n) are displayed in overlap state during the display response time period RE0 shown in FIG. 11, after the image (n−1) starts to be updated to the image (n). This is because the transmittance is in a range between 10% and 90% when the liquid crystal 46 is turned on/off, as shown in FIG. 12. After the display response time period RED elapses, the image (n−1) is erased from the annunciator 10, such that only the image (n) is displayed in the annunciator 10 during the predetermined extension period EXT. Therefore, a vehicle driver can recognize the image (n) during the predetermined extension period EXT.

Only the image (n) is displayed during the predetermined extension period EXT, and the image (n−1) is not displayed during the predetermined extension period EXT. The predetermined extension period EXT has a length sufficient for the driver to be able to securely recognize the image (n). Specifically, when the predetermined extension period EXT is defined to be about 100 ms, for example, the driver can recognize display content displayed on the annunciator 10.

For example, the image (n−1) before updating represents "4 km/h" shown in FIG. 14A, and the image (n) after the updating represents "7 km/h" shown in FIG. 14C. The image (n−1) is changed to the image (n) through an overlap image shown in FIG. 14B. In the overlap image, "4 km/h" and "7 km/h" are overlap with each other on the annunciator 10.

During the display response time period RED shown in FIG. 11, the annunciator 10 displays the image shown in FIG. 14B. The vehicle driver cannot recognize the image shown in FIG. 143. However, the image of "7 km/h" continues to be displayed during the extension period EXT after the display response time period RE0 elapses. Therefore, the vehicle driver can recognize the image of "7 km/h" during the extension period EXT.

Thus, the vehicle driver can recognize updated image without inserting a background image at the updating time. Further, because the background image is not inserted, display update interval can be made short, compared with a case in which the background image is inserted. Accordingly, vehicle information changing from moment to moment such as a vehicle velocity V can be properly displayed.

As shown in FIG. 13, as the liquid crystal temperature T of the liquid crystal 46 is lowered, the response time period RE0 becomes long. As the temperature T of the liquid crystal 46 is raised, the response time period RE0 becomes short.

For example, when the liquid crystal temperature T is equal to −20° C. in FIG. 13, the response time period RE0 becomes equal to 3000 ms. If the display updating time period RN is defined by adding the predetermined extension period EXT to the display response time period RE0, a time period needed for updating the image (n−1) to the image (n) becomes too long. In this case, display performance may become worse for displaying information changing from moment to moment such as a vehicle velocity V.

Therefore, when the liquid crystal temperature T is in a low range, for example, when the liquid crystal temperature T is lower than −7° C., the updating time period RN is fixed to 1500 ms in spite of the response time period RE0. Even if the image (n−1) and the image (n) overlap with each other, the vehicle driver can recognize the image (n), because the updating time period RN is relatively long. Thus, display quality can be improved without lowering display function, relative to information changing from moment to moment such as a vehicle velocity V, for example.

When the liquid crystal temperature T is equal to 50° C. in FIG. 13, the response time period RE0 becomes smaller than 100 ms. If the display updating time period RN is defined by adding the predetermined extension period EXT to the display response time period RE0, the image (n−1) is too rapidly updated to the image (n), while an overlap time is short. In this case, it may be difficult for the vehicle driver to recognize content displayed on the annunciator 10.

Therefore, when the liquid crystal temperature T is in a high range, for example, when the liquid crystal temperature T is higher than 25° C., the updating time period RN is fixed to 300 ms in spite of the response time period RE0. Thus, the vehicle driver can properly recognize the updated image (n).

Display quality of the updated image can be secured relative to the annunciator 10 and the HUD 1, when the liquid crystal temperature T is in a predetermined range. Further, display quality of the updated image can be secured, if the liquid crystal temperature T is out of the predetermined range.

The annunciator 10 of the HUD 1 is described as an example of the liquid crystal display device. Alternatively, the liquid crystal display device may be the liquid crystal display panel 40, and the vehicle driver may directly recognize an image displayed on the panel 40.

(Second Embodiment)

The heating member 71 disposed on the translucent substrate 61 according to the first embodiment is modified in a second embodiment. According to the second embodiment, a part of the heating member 71 is removed, and a resistance adjusting portion 72 for limiting current passing through the heating member 71 is disposed in the removed part of the heating member 71. Thus, a heat emitting amount of the heating member 71 located adjacent to the resistance adjusting portion 72 can be controlled.

Figure 15:
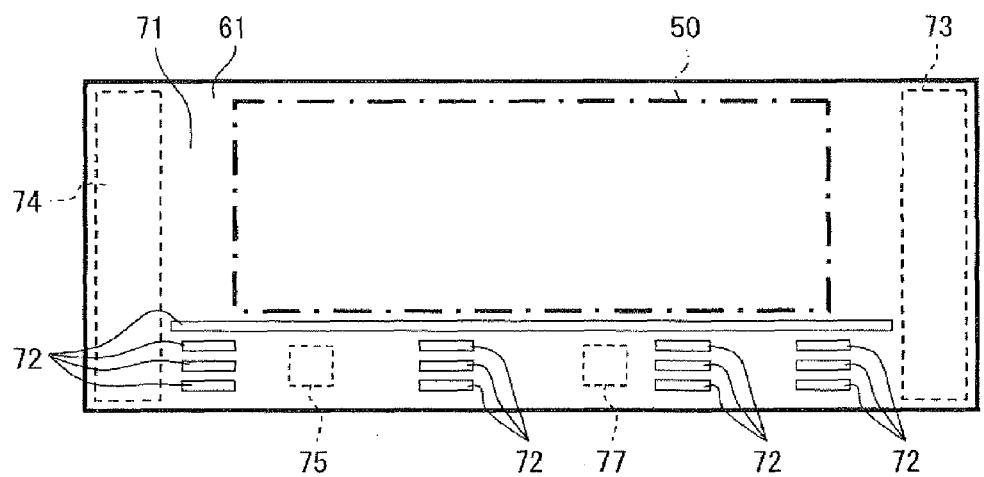
FIG. 15 is a schematic view illustrating a first example arrangement of a resistance adjusting portion of a heating member of a display device according to a second embodiment.
Figure 16:
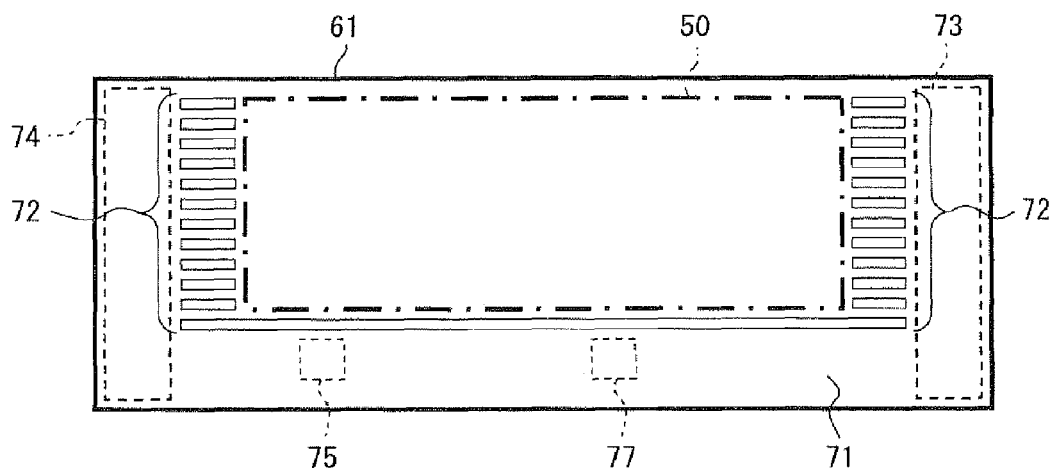
FIG. 16 is a schematic view illustrating a second example arrangement of a resistance adjusting portion of a heating member of a display device according to a second embodiment.

FIG. 15 and FIG. 16 are front views illustrating the translucent substrate 61 having the heating member 71, which is seen from the light source 21.

For example, as shown in FIG. 15, a part of the heating member 71 located adjacent to the thermistor 75, or the heating member 71 disposed on the first protrusion 63 is removed so as to form the resistance adjusting portion 72. When the heating member 71 corresponding to the resistance adjusting portion 72 is removed, current path located front and rear of the removed area is made narrow, such that a resistance value is made higher.

Thus, a heat emitting amount corresponding to an area of the thermistor 75 is made smaller than a heat emitting amount corresponding to an area in which the heating member 71 is not removed. That is, a heat emitting amount of an area adjacent to the thermistor 75 is made smaller than a heat emitting amount of the display area 50 shown in a chain line of FIG. 15.

As shown in FIG. 16, the heating member 71 located between the display area 50 and the heater connector 73, 74 is removed so as to form the resistance adjusting portion 72. That is, the resistance adjusting portion 72 is located to sandwich the display area 50. When the heating member 71 corresponding to the resistance adjusting portion 72 is removed, current path located front and rear of the removed area is made narrow, such that a resistance value is made higher. Thus, a heat emitting amount corresponding of the display area 50 is made smaller than a heat emitting amount of an area adjacent to the thermistor 75.

As shown in FIG. 15 and FIG. 16, when the resistance adjusting portion 72 is formed in the heating member 71, the heat emitting amount of an area adjacent to the thermistor 75 or the heat emitting amount of the display area 50 can be properly controlled. Thus, a relationship between a temperature increasing of the liquid crystal 46 and a temperature detected by the thermistor 75 can be properly controlled when electricity is supplied to the heating member 71. Therefore, the temperature detected by the thermistor 75 can correspond to the temperature of the liquid crystal 46, and accuracy for detecting the temperature of the liquid crystal 46 of the liquid crystal display panel 40 can be improved.

A shadow may be generated by a borderline between the heating member 71 and the resistance adjusting portion 72. However, because the resistance adjusting portion 72 is located outside of the display area 50, the shadow is not generated on an image displayed on the annunciator 10 when light is illuminated from the light source 21.

(Third Embodiment)

Figure 17:
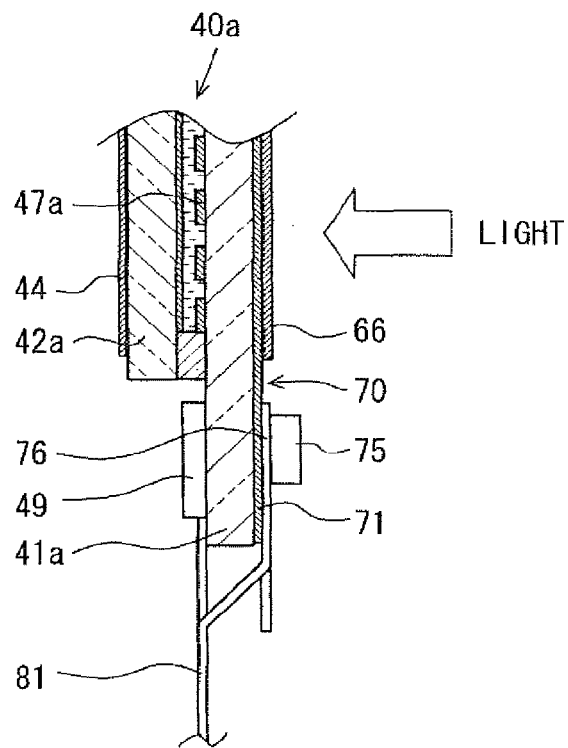
FIG. 17 is an enlarged cross-sectional view illustrating a liquid crystal panel of a display device according to a third embodiment.

In a third embodiment, the heater 70 and the thermistor 75 according to the first embodiment are applied to a twisted nematic (TN) type liquid crystal panel, or a thin film transistor (TFT) type liquid crystal panel. FIG. 17 is an enlarged cross-sectional view illustrating a TN type liquid crystal display panel 40a.

As shown in FIG. 17, a heater 70 is disposed on a translucent substrate 41a opposing to a light source 21. A transparent electrode 47a is disposed on a face of the translucent substrate 41a, and a heating member 71 of the heater 70 is disposed on all of a face of the translucent substrate 41a opposite from the electrode 47a. A temperature detecting portion 76 of a thermistor 75 is located adjacent to the heating member 71. A polarization board 66 is disposed on the heating member 71 so as to oppose the light source 21. A polarization board 44 is disposed on a translucent substrate 42a opposite from the light source 21.

The heating member 71 of the heater 70 is disposed on the translucent substrate 41a constructing the liquid crystal display panel 40a, thereby a thickness of the annunciator 10 can be made thinner.

(Fourth Embodiment)

Figure 18:
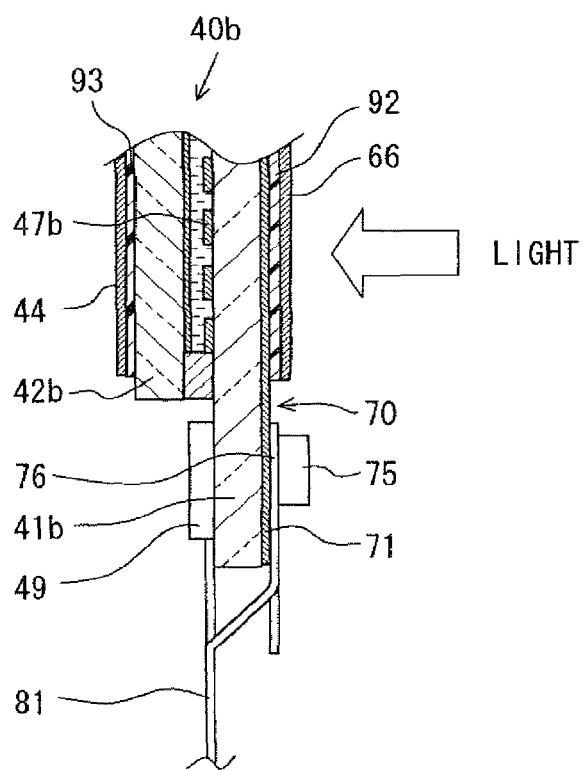
FIG. 18 is an enlarged cross-sectional view illustrating a first example of a liquid crystal panel of a display device according to a fourth embodiment.
Figure 19:
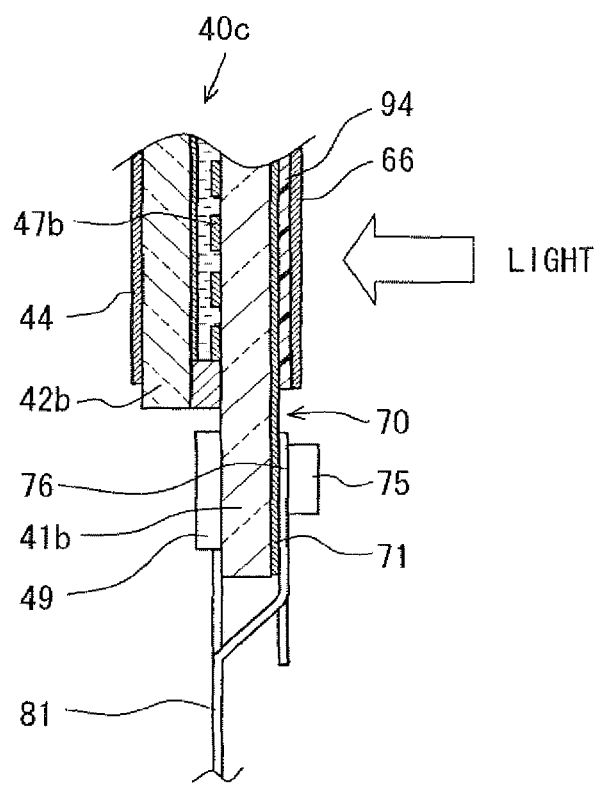
FIG. 19 is an enlarged cross-sectional view illustrating a second example of a liquid crystal panel of a display device according to a fourth embodiment.

In a fourth embodiment, the heater 70 and the thermistor 75 according to the first embodiment are applied to a film super twisted nematic (FSTN) type liquid crystal panel. FIG. 18 is an enlarged cross-sectional view illustrating a FSTN type liquid crystal display panel 40b. FIG. 19 is an enlarged cross-sectional view illustrating an automotive super twisted nematic (ASTN) type liquid crystal display panel 40c, which is a kind of the FSTN type liquid crystal display panel.

As shown in FIG. 18, the FSTN type panel 40b includes translucent substrates 41b, 42b, polarization boards 66, 44, and phase-contrast films 92, 93 made of polymer, for example. The polarization board 66 is disposed on an outer face of the translucent substrate 41b, and the polarization board 44 is disposed on an outer face of the translucent substrate 42b. The phase-contrast film 92 is arranged between the polarization board 66 and the translucent substrate 41b, and the phase-contrast film 93 is arranged between the polarization board 44 and the translucent substrate 42b.

The heater 70 is disposed on the translucent substrate 41b opposing to the light source 21. A transparent electrode 47b is disposed on a face of the translucent substrate 41b, and a heating member 71 of the heater 70 is disposed on all of a face of the translucent substrate 41b opposite from the electrode 47b. A temperature detecting portion 76 of the thermistor 75 is located adjacent to the heating member 71.

As shown in FIG. 19, the ASTN type panel 40c includes a compensating film 94 located between a translucent substrate 41b and a polarization board 66.

A heater 70 is disposed on the translucent substrate 41b opposing to the light source 21. A transparent electrode 47b is disposed on a face of the translucent substrate 41b, and a heating member 71 of the heater 70 is disposed on all of a face of the translucent substrate 41b opposite from the electrode 47b. A temperature detecting portion 76 of the thermistor 75 is located adjacent to the heating member 71.

Such changes and modifications are to be understood as being within the scope of the present invention as defined by the appended claims.

What is claimed is:

1. A liquid crystal display device comprising:
    a liquid crystal display panel including
        a first substrate and a second substrate opposing to the first substrate, a plurality of electrodes disposed between the first substrate and the second substrate, and
        liquid crystal sealed between the first substrate and the second substrate, wherein the liquid crystal display panel has a display area and an outside area which is directly outside of the display area;
    a heater having a transparent heating member disposed opposite to the electrodes through the first substrate, the heating member emitting heat by being supplied with electricity, the heating member being arranged to oppose the liquid crystal display panel, the heater including a first heater connector and a second heater connector which supply electricity to the to the heating member, and wherein the heating member is located in both the display area and the outside area of the liquid crystal display panel; and
    a temperature detector having a temperature detecting portion, wherein
    at least a part of the heating member is located to overlap with the display area of the liquid crystal display panel in a thickness direction of the substrates,
    the temperature detecting portion of the temperature detector and the heating member of the heater are located adjacent to each other, and
    the heating member has a plurality of resistance adjusting portions that increase a resistance of portions of the heating member to limit current flowing through the heating member located in the display area or current flowing adjacent to the temperature detector, the plurality of resistance adjusting portions being located to oppose the liquid crystal display panel, the plurality of resistance adjusting portions being located between the first connector and the second connector of the heater, wherein the plurality of resistance adjusting portions are located only in the outside area, and wherein the plurality of resistance adjusting portions narrow a physical path for current to flow through the heating member, to thereby reduce an amount of heat emitted by a portion of the heating member.

2. The liquid crystal display device according to claim 1, wherein the heater further has a supporting board for supporting the heating member, and the temperature detector is disposed on the heating member through the supporting board.

3. The liquid crystal display device according to claim 2, further including
    a compensating panel disposed adjacent to the first substrate of the liquid crystal display panel, wherein
    the compensating panel has
        a third substrate opposing to the liquid crystal display panel,
        a fourth substrate located opposite to the liquid crystal display panel through the third substrate, and
        liquid crystal sealed between the third substrate and the fourth substrate,
    the supporting board of the heater is the third substrate of the compensating panel.

4. The liquid crystal display device according to claim 1, wherein the heating member is disposed on a face of the first substrate opposite from the electrodes, and the temperature detector is disposed on the heating member opposite from the electrodes.

5. The liquid crystal display device according to claim 1, wherein the heating member is further located outside of the display area of the liquid crystal display panel in the thickness direction of the substrates, and the temperature detector is disposed adjacent to the heating member located outside of the display area.

6. The liquid crystal display device according to claim 1, wherein the heating member covers at least entire face of the display area.

7. The liquid crystal display device according to claim 1, wherein the resistance adjusting portions increase a resistance of portions of the heating member by removing a part of the heating member.

8. The liquid crystal display device according to claim 1, wherein the heating member is further located outside of the display area of the liquid crystal display panel in the thickness direction of the substrates, and the resistance adjusting portions increase a resistance of the heating member by removing a part of the heating member located outside of the display area.

9. The liquid crystal display device according to claim 1, further comprising a temperature fuse located adjacent to the heating member, wherein the temperature fuse is connected to the heating member in series.

10. The liquid crystal display device according to claim 1, wherein the temperature detector is a thermistor.

11. The liquid crystal display device according to claim 1, wherein the temperature detector is located in the outside area of the liquid crystal display panel.

12. The liquid crystal display device according to claim 1, wherein the plurality of resistance adjusting portions comprise a plurality of apertures that are formed through the material of the heating member.

13. The liquid crystal display device according to claim 1, further comprising a flexible print board that is connected to the first connector and the second connector.

14. The liquid crystal display device according to claim 13, wherein the temperature detector is directly fixed to a surface of the flexible print board.

* * * * *